(12) United States Patent
Watanabe et al.

(10) Patent No.: US 9,885,325 B2
(45) Date of Patent: Feb. 6, 2018

(54) AIR INTAKE CHAMBER FOR SADDLED VEHICLE

(71) Applicant: Kawasaki Jukogyo Kabushiki Kaisha, Kobe-shi, Kyogo (JP)

(72) Inventors: Hiroyuki Watanabe, Kobe (JP); Hisatoyo Arima, Himeji (JP); Satoaki Ichi, Akashi (JP); Yoshinobu Tanaka, Hyogo (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 71 days.

(21) Appl. No.: 14/938,687

(22) Filed: Nov. 11, 2015

(65) Prior Publication Data
US 2016/0061162 A1     Mar. 3, 2016

Related U.S. Application Data

(63) Continuation of application No. PCT/JP2014/051563, filed on Jan. 24, 2014.

(30) Foreign Application Priority Data

May 17, 2013   (JP) ................. 2013-105484

(51) Int. Cl.
*F02M 35/10* (2006.01)
*F02M 35/16* (2006.01)
(Continued)

(52) U.S. Cl.
CPC ....... *F02M 35/10157* (2013.01); *B62K 19/48* (2013.01); *F02B 33/40* (2013.01);
(Continued)

(58) Field of Classification Search
CPC .......... F02B 33/40; F02B 33/44; F02B 61/00; F02M 35/10157; F02M 35/10177;
(Continued)

(56) References Cited

U.S. PATENT DOCUMENTS 4,475,617 A * 10/1984 Minami ................. B62K 11/04
                                                            123/559.1
8,646,438 B2     2/2014 Saeki et al.
(Continued)

FOREIGN PATENT DOCUMENTS

CN     102686846    9/2012
JP     57-137531    2/1981
(Continued)

OTHER PUBLICATIONS

Notification of Reason(s) for Rejection dated Aug. 23, 2016 for Corresponding Japanese Patent Application No. 2015-516944 with English language Summary (17 pages).
(Continued)

*Primary Examiner* — Audrey K Bradley

(57) ABSTRACT

An air intake chamber is disposed at a location downstream of a supercharger and upstream of a throttle body. The air intake chamber serves to accumulate an intake air pressurized by the supercharger. This air intake chamber includes a confronting portion, which has an outlet and overlaps the throttle body, and a connecting portion that connects between the confronting portion and a discharge port of the supercharger. The connecting portion has an outlet side opening set to be larger than an inlet side opening thereof.

8 Claims, 7 Drawing Sheets

(51) Int. Cl.
*F02B 33/40* (2006.01)
*F02B 33/44* (2006.01)
*B62K 19/48* (2006.01)
*F02B 61/00* (2006.01)
*F02M 35/104* (2006.01)

(52) U.S. Cl.
CPC .............. *F02B 33/44* (2013.01); *F02B 61/00* (2013.01); *F02M 35/1042* (2013.01); *F02M 35/162* (2013.01); *F02M 35/10177* (2013.01); *Y02T 10/144* (2013.01)

(58) Field of Classification Search
CPC .. F02M 35/1042; F02M 35/162; B62K 19/48; Y02T 10/144
See application file for complete search history.

(56) References Cited

U.S. PATENT DOCUMENTS

| | | | |
|---|---|---|---|
| 8,707,931 | B2 | 4/2014 | Arima et al. |
| 2002/0084125 | A1 | 7/2002 | Scheumacher et al. |
| 2010/0050972 | A1 | 3/2010 | Cassinelli et al. |
| 2012/0192839 | A1 | 8/2012 | Arima et al. |
| 2012/0260896 | A1 | 10/2012 | Saeki et al. |
| 2012/0267182 | A1 | 10/2012 | Saeki et al. |
| 2013/0220259 | A1* | 8/2013 | Ozaki .............. F02M 35/10091 123/184.21 |

FOREIGN PATENT DOCUMENTS

| | | |
|---|---|---|
| JP | 57-062957 | 4/1982 |
| JP | 58-174120 | 10/1983 |
| JP | 59-137369 | 9/1984 |
| JP | 02-006289 | 1/1990 |
| JP | 03-275971 | 12/1991 |
| JP | 04-362268 | 12/1992 |
| JP | 10-169521 | 6/1998 |
| WO | WO2008/095859 | 8/2008 |
| WO | WO2011/046098 | 4/2011 |

OTHER PUBLICATIONS

International Search Report for PCT/JP2014/051563, filed Jan. 24, 2014.
English Translation of the International Preliminary Report on Patentability and Written Opinion of the International Searching Authority dated Nov. 26, 2015 for International PCT Patent Application No. PCT/JP2014/051563, filed Jan. 24, 2014 (15 pages).
First Office Action dated Mar. 24, 2017 with English language Translation of the Search Report for Corresponding Chinese Patent Application No. 201480028306.6 (8 pages).
Extended and Supplementary Search Report dated Nov. 25, 2016 for Corresponding European Patent Application No. 14798478.5 (8 pages).
Communication Pursuant to Article 94(3) EPC dated Oct. 19, 2017 for Corresponding European Patent Application No. 14798478.5 (4 pages).

* cited by examiner

AIR INTAKE CHAMBER FOR SADDLED VEHICLE

CROSS REFERENCE TO THE RELATED APPLICATION

This application is a continuation application, under 35 U.S.C § 111(a) of international application No. PCT/JP2014/051563, filed Jan. 24, 2014, which claims priority to Japanese patent application No. 2013-105484, filed May 17, 2013, the entire disclosure of which is herein incorporated by reference as a part of this application.

BACKGROUND OF THE INVENTION

Field of the Invention

The present invention relates to an air intake chamber in a saddle-riding type vehicle, in which an intake air having been pressurized by a supercharger is accumulated.

Description of Related Art

Hitherto in a saddle-riding type vehicle equipped with a supercharger, a surge tank or air intake chamber is disposed on an upstream side of a throttle body so that air pressurized by the supercharger can be introduced into the surge tank prior to a distributed supply of such pressurized air from the surge tank into a cylinder through the throttle body. A discharge port of the supercharger and an inlet port of the surge tank are fluidly connected with a tubular connecting pipe. In this respect, see the patent document 1 listed below.

PRIOR ART LITERATURE

Patent Document 1: JP Laid-open Patent Publication No. H02-006289

In the saddle-riding type vehicle of such a type as disclosed in the above mentioned patent document 1, demands have been arisen to increase the engine output.

SUMMARY OF THE INVENTION

The present invention has been devised in view of the foregoing problems and inconveniences and is intended to provide an air intake chamber for use in the saddle-riding type vehicle, which can enhance an engine output.

In order to accomplish the foregoing object of the present invention, an air intake chamber for use in a saddle-riding type vehicle in accordance with the present invention is disposed downstream of a discharge port of a supercharger, which is operable to pressurize and supply an intake air to an engine, and upstream of a throttle body to control the amount of intake air to be supplied to an air intake port of the engine. The air intake chamber referred to above includes a confronting portion having an outlet of the air intake chamber and facing the throttle body; and a connecting portion to connect the confronting portion and the discharge port of the supercharger. The connecting portion referred to above has an outlet side opening that is set to be greater than an inlet side opening.

The inventors of the present invention have found that if the capacity for accumulating the pressurized air at a location upstream of the throttle body is increased, the output of the combustion engine increases. However, it has also been found that if the widthwise dimension and the vertical dimension in the vicinity of the throttle body are increased, the dimension of the saddle-riding type vehicle itself increases or lowering of the degree of freedom in configurational design is accompanied. In view of this, the capacity of the air intake chamber is increased by the utilization of the connecting tube, which fluidly connects between the supercharger and the air intake chamber, as a part of the air intake chamber. According to this structural feature, an appropriate chamber shape can be maintained in the vicinity of a throttle body and, while the increase in size of the vehicle and the reduction in degree of freedom of designing are suppressed, the output of the combustion engine can be increased.

In a preferred embodiment of the present invention, the outlet side opening of the connecting portion may have a widthwise dimension that is set to the same dimension as a widthwise dimension of the confronting portion, in which case the inlet side opening of the connecting portion has a widthwise dimension that is set to the same dimension as a diameter of the discharge port of the supercharger. According to this structural feature, the capacity of the air intake chamber can be increased effectively and the output of the combustion engine can be increased.

In another preferred embodiment of the present invention, the connecting portion may have a transverse width that gradually increase from the inlet side opening towards the outlet side opening. According to this structural feature, since the flow velocity of the intake air decreases gradually, the turbulence of a stream of the intake air is suppressed, and, therefore, the air intake efficiency increases.

In a different preferred embodiment of the present invention, the discharge port of the supercharger may be disposed at a location separated rearwardly of the confronting portion. According to this structural feature, the capacity of the air intake chamber can be increased by increasing a forward and rearward direction dimension of the connecting portion.

In a further preferred embodiment of the present invention, where the air intake chamber and the supercharger are disposed juxtaposed relative to each other in the forward and rearward direction or longitudinal direction of the vehicle, an impeller shaft of the supercharger may be positioned above a rear portion of the crankcase. In this case, the discharge port of the supercharger is preferably positioned rearwardly of the impeller shaft. According to these structural features, the size of the connecting portion increased by increasing the longitudinal direction dimension between the discharge port of the supercharger and the confronting portion, and therefore, the capacity of the air intake chamber can be increased.

In a yet further preferred embodiment of the present invention, the air intake chamber may be disposed above a cylinder block of the engine, and the supercharger may be disposed rearwardly of the cylinder block of the engine and above the crankcase of the combustion engine, in which case an intake air duct for guiding an incoming wind, then flowing forwardly of the engine, towards the supercharger, is disposed to pass laterally of the cylinder block. According to this structural feature, with the interference between the air intake chamber and the air intake duct avoided, the capacity of the air intake chamber can be increased.

In a still further preferred embodiment of the present invention, the supercharger may be disposed rearwardly of a cylinder block of the engine, in which case the air intake chamber has a front wall protruding to be positioned forwardly of a throttle body mounting portion defined in the confronting portion. According to this structural feature, by a quantity corresponding to the front wall protruding forwards, the air intake chamber can be expanded in the longitudinal direction.

In the practice of the present invention, the dimension from an upstream end portion to a downstream end portion of the air intake chamber is preferably equal to or greater than three times an inner diameter of the outlet of the air intake chamber. According to this dimensional feature, the output of the combustion engine suitably increases.

According to a yet further preferred embodiment of the present invention, the engine has a plurality of cylinders and a plurality of outlets corresponding to the respective cylinders are juxtaposed in a transverse direction of the air intake chamber, in which case, there is provided a suppressing member to suppress a movement of an intake air from a region adjacent to one of the adjoining two outlets to the neighborhood of the other of the adjoining two outlets. According to this feature, since the use of the suppressing member is effective to suppress the movement of the intake air which is a pressurized air, the intake air can be uniformly supplied to the respective cylinders.

In a yet still preferred embodiment of the present invention, the use may be made of a rectifying member to avoid a bias occurring in the flow of an intake air within an interior space of the air intake chamber. According to the use of the rectifying member, the bias of the flow of the intake air within the interior space of the air intake chamber can be suppressed, and therefore, the intake air can be stably supplied to an air intake port.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Hereinafter, a preferred embodiment of the present invention will be described with particular reference to the accompanying drawings. In describing the present invention, however, the terms "left and right" that are used hereinabove and hereinafter are to be understood as relative terms descriptive of positions and/or directions as viewed from a motorcycle rider occupying the seat during the forward travel of the motorcycle.

Figure 1:
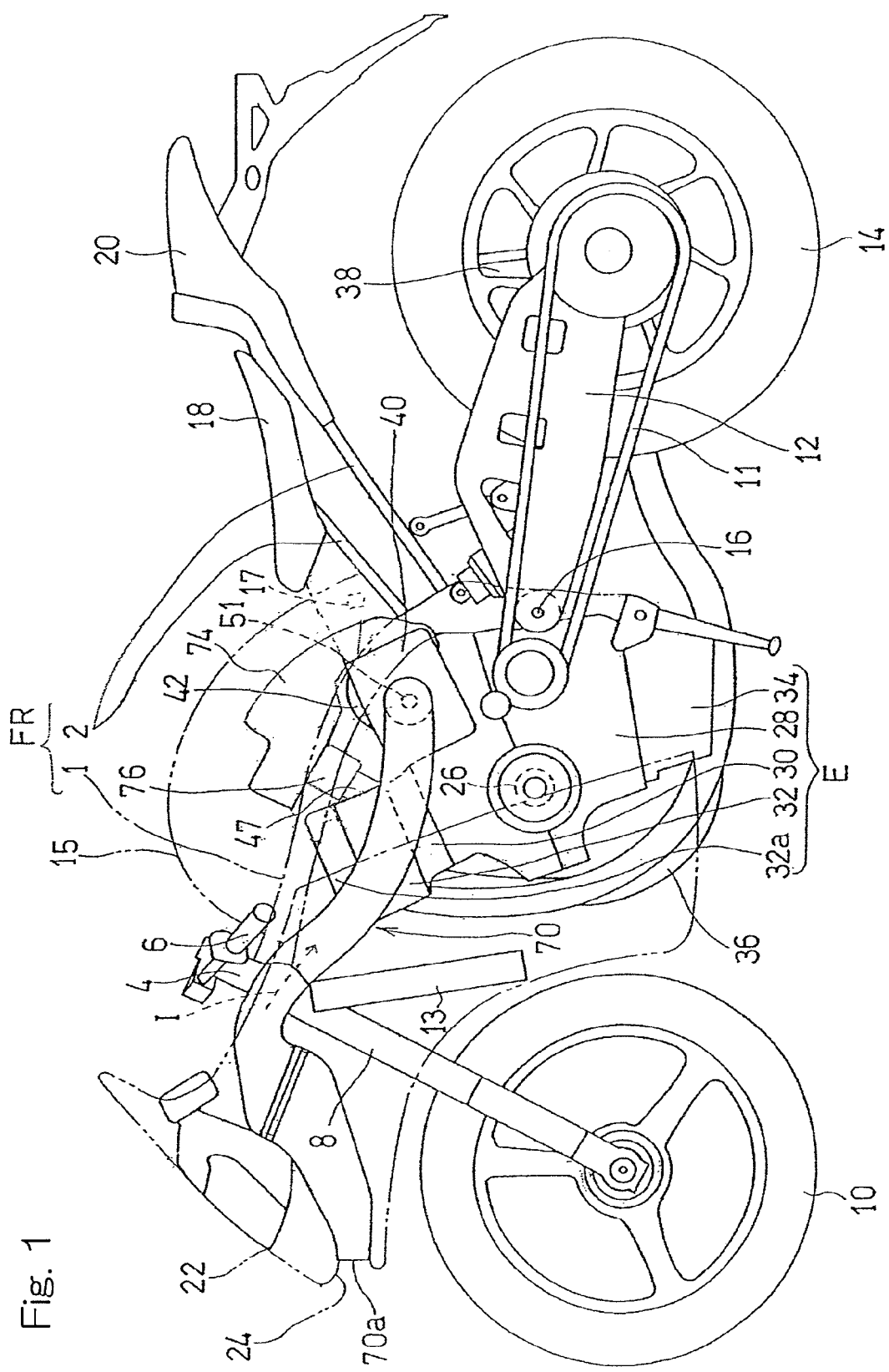
FIG. 1 is a schematic side view showing a motorcycle which is a sort of saddle-riding type vehicle and which is equipped with an air intake chamber designed in accordance with a preferred embodiment of the present invention.

FIG. 1 is a left side view of a motorcycle, which is a sort of saddle-riding type vehicle and which is equipped with an air intake chamber designed in accordance with the preferred embodiment of the present invention. The illustrated motorcycle includes a vehicle body frame structure FR, which includes a main frame 1 forming a front half unit thereof and a rear frame 2 fitted to a rear portion of the main frame 1 and forming a rear half unit thereof. A head pipe 4 formed integrally with a front end of the main frame 1 has a front fork 8 rotatably supported thereby through a steering shaft (not shown), and a front wheel 10 is fitted to the front fork 8. A handlebar 6 for steering purpose is fixed to an upper end portion of the front fork 8.

On the other hand, a swingarm 12 is supported by a rear end portion of the main frame 1 for movement up and down about a pivot pin 16, and a rear wheel 14 is supported by a rear end portion of this swingarm 12. A combustion engine E, which forms a drive source of the motorcycle, is fitted to a lower portion of the main frame 1 and on a front side of the swingarm 12, and is used to drive the rear wheel 14 through a power transmission mechanism 11 such as, for example, a substantially endless chain. The combustion engine E is in the form of a four cylinder, four cycle parallel multi-cylinder engine of a water cooled type, and a radiator 13 for an engine cooling liquid is disposed forwardly of the combustion engine E. The four cylinders is juxtaposed relative to each other in a widthwise direction of the combustion engine E, which is in coincide with a vehicle widthwise direction. In any event, it is to be noted that the type of the combustion engine E that can be utilized in the practice of the present invention is not necessarily limited to that shown and described.

A fuel tank 15 is disposed above the main frame 1, and a rider's seat 18 and a fellow passenger's seat 20 are supported by the rear frame 2. A fuel pump 17 for supplying fuel towards the combustion engine E is disposed in a lower area of a rear end of the interior of the fuel tank 15. Also, a front fairing 22 made of a resinous material and used to cover a region forwardly of the head pipe 4 is mounted on a vehicle body front portion. The front fairing 22 is formed with an air intake opening 24 through which an intake air can be captured from the outside so as to supply it towards the combustion engine E.

The combustion engine E includes a crankshaft 26 extending in a vehicle widthwise direction, a crankcase 28 for accommodating therein the crankshaft 26 and a transmission, a cylinder block 30 protruding upwardly from an upper surface of a front portion of the crankcase 28, a cylinder head 32 positioned above the cylinder block 30, and an oil pan 34 provided below the crankcase 28. The cylinder head 32 has a head covering 32a. The cylinder block 30 and the cylinder head 32 are each tilted somewhat forwardly. More specifically, a piston axis line of the combustion engine E extends upwards in a forwardly tilted fashion. Four exhaust pipes 36 connected with an exhaust port at a front face of the cylinder head 32 are merged together at a location beneath the combustion engine E and is in turn fluidly connected with an exhaust muffler 38 that is disposed on a right side of the rear wheel 14.

Figure 2:
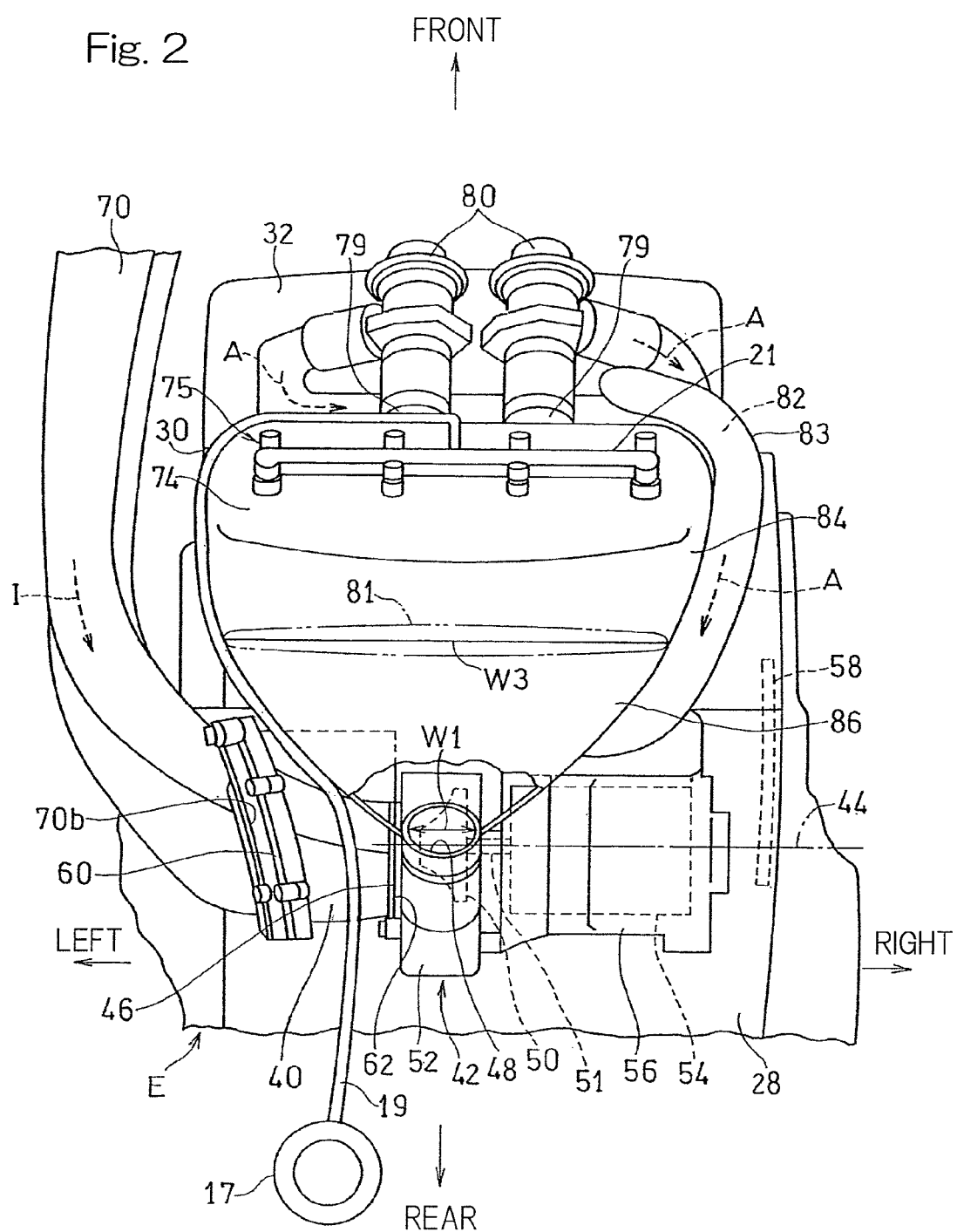
FIG. 2 is a perspective view of a combustion engine used in the motorcycle as viewed from rear in a diagonally downward direction.

As shown in FIG. 2, on an upper surface of the crankcase 28 and rearwardly of the cylinder block 30, an air cleaner 40 and a supercharger 42 are disposed juxtaposed relative to each other in a leftward and rightward direction (vehicle widthwise direction). The air cleaner 40 substantially purifies the outside air, and the supercharger 42 pressurizes and then supplies a substantially purified air from the air cleaner 40 to the combustion engine E. The supercharger 42 is of a centrifugal type supercharger that is driven by a driving power transmitted from the combustion engine E through a mechanical power transmitting system.

Figure 3:
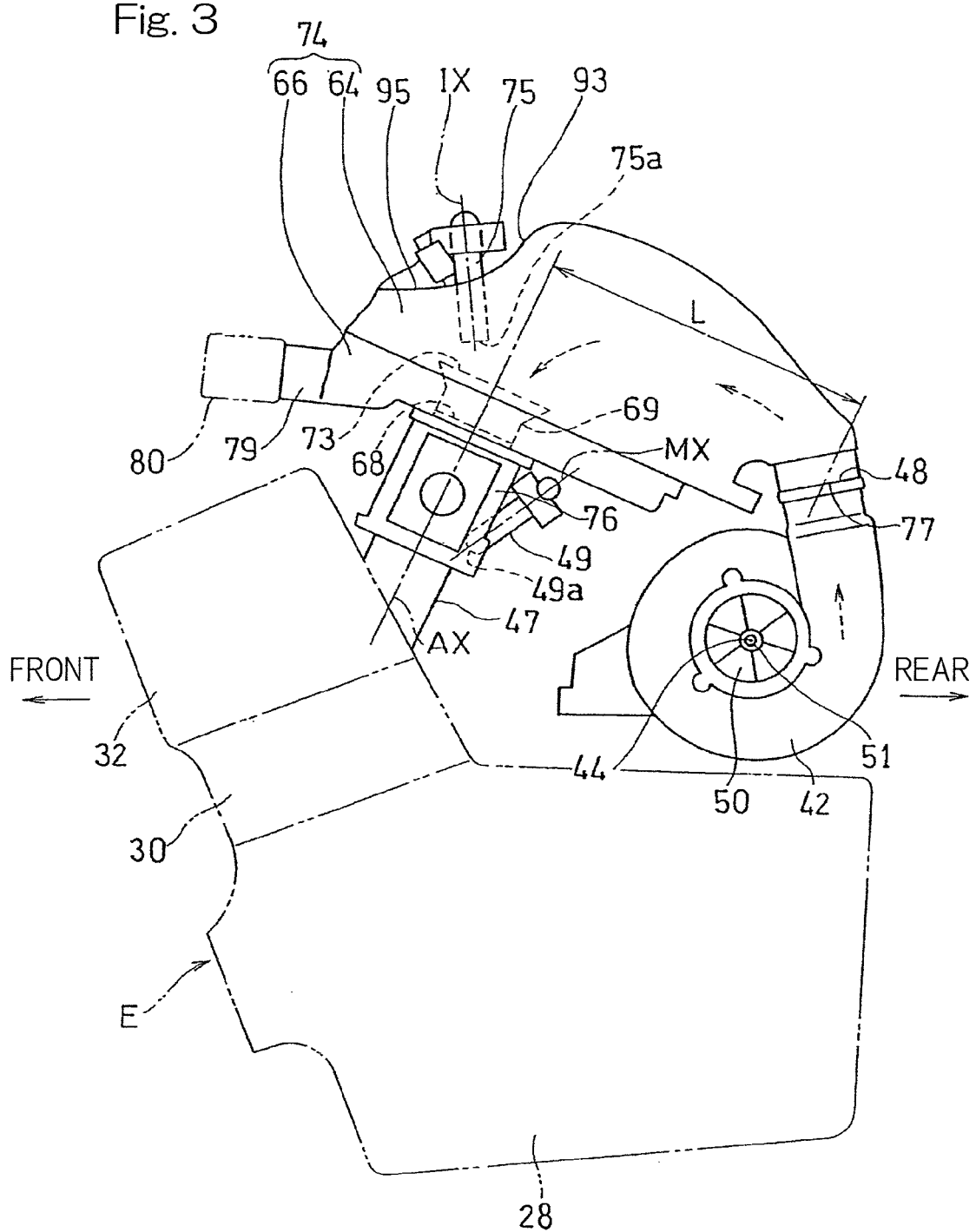
FIG. 3 is a schematic side view showing an arrangement of the air intake chamber and a supercharger employed in the motorcycle.

The supercharger 42 is disposed on a right side of the air cleaner 40 while adjoining thereto, and is fixed to the upper surface of the crankcase 28 by means of bolts (not shown). The supercharger 42 has a rotational axis 44 that extends in the vehicle widthwise direction above a rear portion of the crankcase 28. The supercharger 42 has a leftwardly oriented suction port 46 defined therein and positioned above the crankcase 28 and at an intermediate portion of the combustion engine E with respect to the vehicle widthwise direction. The supercharger 42 also has a discharge port 48 defined therein at the intermediate portion of the combustion engine E with respect to the vehicle widthwise direction. More specifically, the discharge port 48 is positioned at a vehicle widthwise direction intermediate site of a cylinder side opening 68 (best shown in FIG. 4) as will be discussed in detail later. As shown in FIG. 3, the discharge port 48 of the supercharger 42 is positioned rearwardly of the rotational axis 44.

The supercharger 42 shown in FIG. 2 includes an impeller 50 for pressurizing the intake air, an impeller housing 52 enclosing the impeller 50 therein, a transmission mechanism 54 forming a part of the power transmitting system for transmitting the power of the combustion engine E to the impeller 50, and a transmission mechanism housing 56 enclosing the transmission mechanism 54 therein. The transmission mechanism 54 and the air cleaner 40 are disposed on respective sides of the impeller housing 52 with respect to the vehicle widthwise direction. The impeller housing 52 is connected with the transmission mechanism housing 56 and the air cleaner 40 by means of bolts (not shown). The transmission mechanism 54 is disposed to be displaced on one side of the vehicle widthwise direction with respect to a vehicle widthwise direction intermediate point. In the embodiment now under discussion, the transmission mechanism 54 is disposed having been displaced rightwards, and a chain 58, that forms a part of the power transmitting system for the supercharger 42, is disposed rightwardly of the combustion engine E The air cleaner 40 referred to above has a cleaner outlet 62 fluidly connected with the suction port 46 of the supercharger 42 and also has a cleaner inlet 60 fluidly connected, from outside of the vehicle widthwise direction, with an air intake duct 70 for introducing the outside air into the supercharger 42. The air intake duct 70 is disposed on a left side opposite to the right side where the chain 58 is disposed. Accordingly, it is possible to prevent the air intake duct 70 from protruding in the outside of the vehicle widthwise direction. As shown in FIG. 1, the air intake duct 70 passes (extends) a lateral region of the cylinder block 30.

As shown in FIG. 3, the discharge port 48 of the supercharger 42 is oriented upwardly. An air intake chamber 74 is disposed intermediate between the discharge port 48 and an air intake port 47 of the combustion engine E with respect to a forward and rearward direction or longitudinal direction of the motorcycle. This air intake chamber 74 forms a part of an air passage extending from the discharge port 48 of the supercharger 42 to the cylinder head 32. The discharge port 48 of the supercharger 42 and an inlet 77 of the air intake chamber 74 are directly fluidly connected with each other. The air intake port 47 is formed in a rear portion of the cylinder head 32. The air intake chamber 74 is made of a metallic material, and in the practice of the embodiment now under discussion, the air intake chamber 74 is made of an aluminum alloy. Connection between the discharge port 48 of the supercharger 42 and the inlet 77 of the air intake chamber 74 is accomplished, for example, by the use of a rubber hose (not shown) having its opposite open ends mounted on respective outer peripheries of the discharge port 48 and the inlet 77 while corresponding open end faces of the discharge port 48 and the inlet 77 are butted together.

Figure 5:
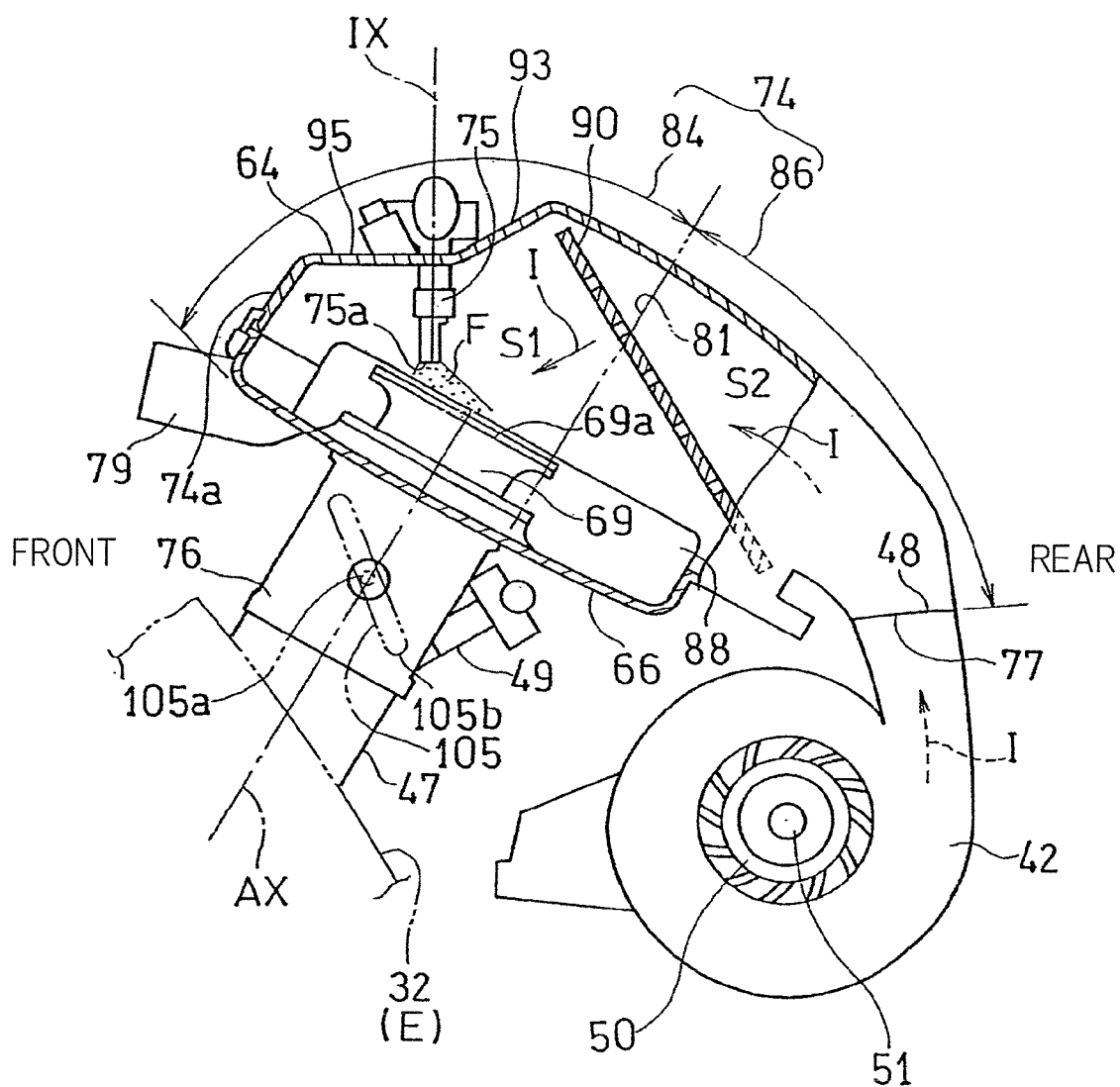
FIG. 5 is a cross sectional view taken along the line V-V in FIG. 4.

A throttle body 76 for controlling the amount of intake air to be supplied towards the air intake port 47 of the combustion engine E is disposed between the air intake chamber 74 and the cylinder head 32. In other words, the air intake chamber 74 is disposed downstream of the supercharger 42 and upstream of the throttle body 76, and is operable to accumulate the intake air which has been pressurized, that is, the pressurized intake air. As shown in FIG. 5, the throttle body 76 is provided with a throttle valve 105. The throttle valve 105 is operable to adjust the amount of the intake air to be supplied to the air intake port 47. This throttle valve 105 may be electrically controlled on the basis of various sensor values, or may be driven and operated manually, or may be provided with both of a valve manually operated and a valve electrically controlled.

The throttle valve 105 has a valve shaft 106a that extends in the vehicle widthwise direction and, when opening from a fully closed condition (the throttle valve 105 being in a horizontal condition), the throttle valve 105 is preferably rotated in a direction with a rear end of the throttle valve 105 moving downwardly, that is, in a clockwise direction as viewed in FIG. 5. Accordingly, when the throttle valve 105 is opened, an injection port 75a of an injector 75, as will be discussed in detail later, and a rear end portion 105b of the throttle valve 105 separate away from each other. Therefore, deposition of fuel on the throttle valve 105 is suppressed.

In this throttle body 76, the fuel is injected into the intake air from the injector 75 with an air and fuel mixture formed consequently, and this air and fuel mixture is then supplied from each air intake port 47 into a corresponding combustion chamber (not shown) within the cylinder bore of the combustion engine E. In addition to the injector 75 referred to above, a main injector 49 is provided on a downstream side of the throttle body 76 for adjusting the air and fuel mixing ratio. Accordingly, variation of the air and fuel mixing ratio can be suppressed. The throttle body 76 is so disposed as to incline upwardly in a direction rearwardly of the air intake port 47. The injector 75 is provided for each cylinder and is mounted on an upper surface of the air intake chamber 74. The injector 75 is preferably of a type capable of injecting the fuel in an atomized form and, more specifically, of a type capable of spray injecting the fuel in a radial direction with respect to an axis line IX.

The main injector 49 is disposed on one side of an axis (an axis line of the throttle body 76) AX of an outlet 73 of the air intake chamber 74 opposite to the injector 75. In the illustrated embodiment, the injection port 75a of the injector 75 is disposed forwardly with respect to the axis line AX of the throttle body 76 as viewed from lateral side and an injection port 49a of the main injector 49 is disposed rearwardly with respect to the axis line AX of the throttle body 76 as viewed from lateral side. Accordingly, any undesirable bias in fuel distribution at locations forwardly and rearwardly with respect to the axis line AX of the throttle body 76 can be suppressed. More specifically, the axis line IX of the injector 75 is inclined relative to the axis line AX of the throttle body 76 in a rearward direction towards the air intake port 47 (below). An axis line MX of the main injector 49 is inclined relative to the axis line AX of the throttle body 76 in a forward direction towards the air intake port 47 (below).

As shown in FIG. 2, the injector 75 has a fuel tube 19 extending in a rearward direction, after having extended forwardly from a delivery tube 21 that extends above the injector 75 in a widthwise direction, and fluidly connected with the fuel pump 17. The fuel tube 19 extends on a left side of the air intake chamber 74 opposite to a relief tube 83, as will be described later, and then extends from a region forwardly of the air intake chamber 74 in the rearward direction. Accordingly, it is possible to avoid an undesirable interference between the fuel tube 19 and the relief tube 83, resulting in increase of the assemblability. With the fuel tube 19 passing laterally of the air intake chamber 74, an undesirable interference between the fuel tube 19 and a member above the air intake chamber 74, for example, the fuel tank 15 can be avoided, and the degree of freedom in designing can increase. The details of the injector 75 will be described later.

The supercharger 42, shown in FIG. 3, has a rear end disposed in the vicinity of a rear end of the crankcase 28. The air intake chamber 74 is disposed at a location diagonally upwardly and forwardly of the supercharger 42 and diagonally upwardly and rearwardly of the cylinder head 32 and the throttle body 76. The air cleaner 40 is disposed below the air intake chamber 74. The fuel tank 15 shown in FIG. 1 is disposed above the air intake chamber 74 and the throttle body 76. The air intake chamber 74 and the injector 75 are overlapped one above the other in a lower portion of the fuel tank 15 when viewed from lateral side.

The air intake chamber 74 has an upper surface which, when viewed from lateral side, is inclined upwardly in a forward direction. The injector 75 is disposed at a location displaced from an uppermost portion of the upper surface of the air intake chamber 74 in the longitudinal direction. In the practice of the embodiment now under discussion, the injector 75 is disposed at a location displaced in the forward direction. Accordingly, it is possible to suppress the amount over which the injector 75 protrudes from the air intake chamber 74 in an upward direction.

A supercharged air passage 46, through which the intake air having been pressurized by the supercharger 42 is supplied towards the combustion engine E, is formed by the air intake chamber 74, shown in FIG. 3, and the throttle body 76. A relief valve 80 for adjusting the air pressure inside the air intake chamber 74 is fluidly connected with a front portion of the air intake chamber 74 through a connecting tube 79 that is formed integrally with the air intake chamber 74. As shown in FIG. 2, the relief tube 83, forming a relief passage 82 through which the high pressure air A is supplied to the air cleaner 40, is fluidly connected with the relief valve 80. The relief tube 83 extends diagonally downwardly and rearwardly after having passed through a right lateral side of the air intake chamber 74, and then extend on a left lateral side between the cylinder block 30 (or the cylinder head 32) and the supercharger 42 before the relief tube 83 is fluidly connected with the air cleaner 40.

The air intake duct 70 shown in FIG. 1 is disposed on a left lateral side, which is one lateral side of the combustion engine E, and is supported by the head pipe 4 while held in position with a front end opening 70a of the air intake duct 70 positioned adjacent to the air intake opening 24 in the front fairing 22. The air intake duct 70 is operable to increase the pressure of the air, introduced from the front end opening 70a, by the well known ram effect. The air intake duct 70 shown in FIG. 2 has a rear end portion 70b with which the air cleaner 40 is fluidly connected. Thus, the air intake duct 70 introduces an incoming wind as the intake air to the supercharger 42 after having passed from forwardly of the combustion engine E and through the left lateral outside of the cylinder block 30 and the cylinder head 32.

As shown in FIG. 3, the air intake chamber 74 includes a chamber main body 64, forming a principal portion thereof, and a holder 66 having a joint portion fluidly connected with the throttle body 76. The holder 66 is formed with the cylinder side opening 68 (best shown in FIG. 4) on which a funnel 69 towards each cylinder of the combustion engine E is mounted. The funnel 69 has a hollow defined therein, which hollow defines the outlet 73 of the air intake chamber 74.

Figure 4:
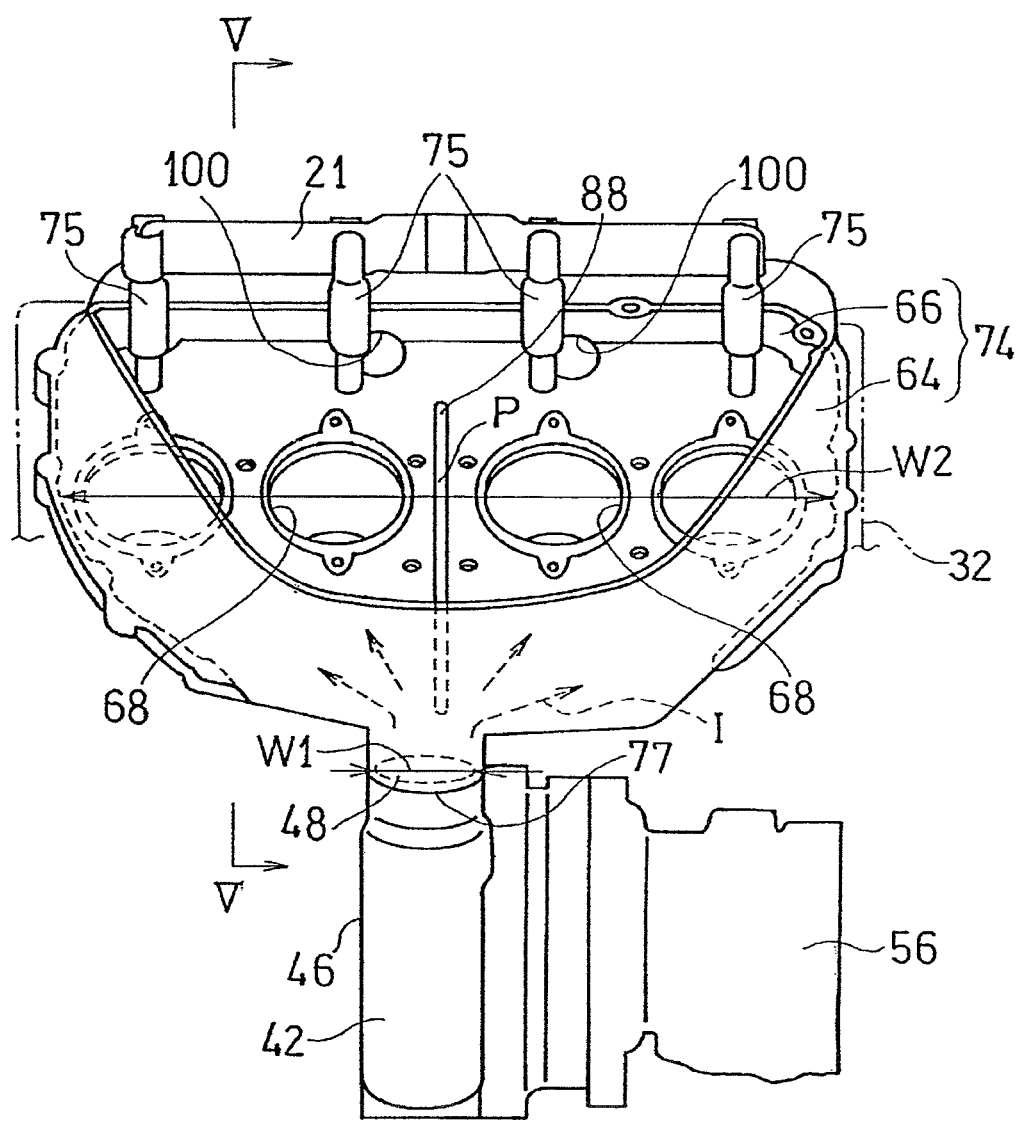
FIG. 4 is a schematic rear view showing the arrangement of the air intake chamber and the supercharger.

FIG. 4 illustrates a rear view of the air intake chamber 74 and the supercharger 42 as viewed from rear of the vehicle body, with a portion of the chamber main body 64 of the air intake chamber 74 cut out. As shown in FIG. 4, the cylinder side opening 68 is made up of four cylinder openings which are equal in number to the number of the engine cylinders and which are juxtaposed in the vehicle widthwise direction (in the leftward and rightward direction). In this way, a downstream side of the air intake chamber 74 is so configured as to have a dimension that is substantially the same as the widthwise dimension of the cylinder head 32.

The inlet 77 referred to previously is positioned at a location separated in a chamber longitudinal direction, which is in coincide with a vehicle longitudinal direction, from a site P between the neighboring cylinder side openings 68 and 68 at an intermediate portion in a chamber transverse direction. Accordingly, the intake air can be equally supplied to each cylinder side opening 68. Also, the transverse widthwise dimension W2 passing across the outlet 73 (best shown in FIG. 3), that is, the cylinder side opening 68 is so chosen as to be greater than the transverse widthwise dimension W1 passing across the inlet 77 in an interior space of the air intake chamber 74. The inlet 77 and outlet 73 of the air intake chamber 74 are disposed having been separated from each other in the longitudinal direction and are formed at a substantially the same heightwise position. In other words, the air intake chamber 74 extends a large distance in the longitudinal direction as compared with that in the vertical direction.

Within the interior of the air intake chamber 74, a suppressing member 88 in the form of a partition wall is formed, which wall extends from a position adjacent the inlet 77 to the site P so as to divide the interior space into two. The suppressing member 88 suppresses a movement of the pressurized air from an area adjacent one of the neighboring two cylinder side openings 68 and 68 to an area adjacent the other of the neighboring two cylinder side openings 68 and 68. As shown in FIG. 5, the suppressing member 88 is provided in the holder 66 and has a substantially same height as an upper end (inlet end) of the funnel 69.

It may happen that as a result of the time lag occurring in intake strokes of the cylinders, a bias may occur in pressure distribution even within the air intake chamber 74. In the event that the intake stroke takes place sequentially in the neighboring cylinders, the suppressing member 88 is preferably disposed between respective two chamber outlets that are disposed in correspondence with the neighboring cylinders. Accordingly, it is possible to avoid the possibility that, when an intake air I within the air intake chamber 74 is sucked in the vicinity of the outlet 73 of the air intake chamber 74 corresponding to one cylinder, an intake air I in the vicinity of the outlet 73 corresponding to the other cylinder may be sucked into such one cylinder. As a result thereof, the variation of the intake air I sucked into the cylinders can be avoided.

Also, by way of example, the outlet 73 positioned on both sides in the vehicle widthwise direction is apt to exhibit a larger amount of intake air as compared with that in the outlet 73 positioned inwardly in the widthwise direction because of neighboring to a side wall. In view of this, the suppressing member 88 may be disposed intermediate between the outlet 73, which is positioned inwardly in the vehicle widthwise direction, and the outlet 73 positioned on both sides in the vehicle widthwise direction. By disposing the suppressing member 88 capable of suppressing the flow of the intake air I moving between the outlets 73 in the widthwise direction, the bias or deviation of the intake air I among the cylinders can be suppressed.

In addition, so that the capacity or volume in the air intake chamber 74 and in the vicinity of the outlet 73 at which the amount of the intake air is small may become large, the suppressing member 88 may be so disposed as to differentiate the respective capacities in the vicinities of the outlets 73. The suppressing member 88 may be disposed only in a confronting portion 84 or may be so disposed as to cover a region from the confronting portion 84 to a connecting portion 86.

The suppressing member 88 employed in the practice of the present invention is formed by the sheet material, and is disposed in a form crossing in the chamber widthwise direction and extends in the chamber longitudinal direction and the chamber vertical direction. The suppressing member 88 may be formed with a transit area through which the intake air I passes across the suppressing member 88 in the widthwise direction. In the practice of the embodiment now under discussion, the suppressing member 88 is disposed spaced a distance in the longitudinal direction between a front wall and a rear wall of the air intake chamber 74, and this distance of separation forms the transit area referred to above. Besides, the suppressing member 88 may be formed with a throughhole that permits a predetermined amount of the intake air I to move in the widthwise direction. With the suppressing member 88 disposed at a location except for the vicinity of the inlet 77 of the air intake chamber 74, the intake air I flowing from the inlet 77 into the interior of the air intake chamber 74 can be distributed towards the cylinders. It is, however, to be noted that the use of the suppressing member 88 may be dispensed with.

The air intake chamber 74 includes the confronting portion 84, which defines an interior space S1 of a portion confronting and overlaps the throttle body 76 in a direction along an axis AX of the outlet of the air intake chamber 74, and the connecting portion, which define an interior space S2 of a portion connecting the interior space S1 and the inlet 77. More specifically, the confronting portion 84 is disposed above the throttle body 76 and the connecting portion 86 is disposed rearwardly of the confronting portion 84. The confronting portion 84 has an inlet side opening which is of the same open area as that of an outlet side opening of the connecting portion 86, and they are serially formed continuously in the direction of flow of the intake air I. The inlet side opening of the confronting portion 84 is disposed in a rear end of the confronting portion 84, and the confronting portion 84 extends in the forward and rearward direction in the same dimension as that of the inlet side opening thereof.

In the practice of the embodiment now under discussion, a front wall 74a of the air intake chamber 74 is protruding to be disposed forwardly of the throttle body 76 and this protruding portion thereof is also included in the confronting portion 84. In other words, the term "confronting portion" employed hereinabove and hereinafter in connection with the embodiment now under discussion is to be understood as meaning a portion that defines the interior space S1 in that portion, which confronts the throttle body 76 when viewed from the direction of the axis X of the outlet of the air intake chamber 74, and an interior space on a downstream side (left side as viewed in FIG. 5) thereof. More specifically, the confronting portion 84 is positioned adjacent to the throttle body 76, has a plurality of outlets of the air intake chamber 74 and also has a function of distributing the intake air I, which has been accumulated, to each cylinder.

The connecting portion 86 referred to above is positioned intermediate between the confronting portion 84 and the discharge port 48 of the supercharger 42. The connecting portion 86 has the inlet 77 of the air intake chamber 74 and also has a function of guiding the intake air I from the discharge port 48 of the supercharger 42 to the confronting portion 84. The connecting portion 86 has an upper surface inclined downwardly in a rearward direction. Accordingly, the upper surface of the connecting portion 86 can be easily adapted to the shape of the posture of a rider when such rider gets on the automotive vehicle. Also, since the intake air I passes smoothly through the connecting portion 86 along the upper wall, the output of the combustion engine E increases. Also, the passage surface area of the inlet 77, which is the inlet side opening of the connecting portion 86, is so chosen as to be smaller than that of a communicating opening 81 with the confronting portion 84 which is the outlet side opening.

More specifically, as shown in FIG. 2, the outlet side opening of the connecting portion 86 has a widthwise dimension W3 which is so chosen as to be the same as the widthwise dimension W2 of the air intake chamber 74, and the widthwise dimension W1 of the inlet side opening of the connecting portion 86 is so chosen as to be the same as the diameter of the discharge port 48 of the supercharger 42. The widthwise dimension W3 of the outlet side opening of the connecting portion 86 may be so chosen as to be greater than the widthwise dimension of the cylinder head 32. Also, the connecting portion 86 is so constructed as to represent a sector shape with its transverse width continuously increasing from the inlet to the outlet. The shape of the connecting portion 86 may, however, not be limited to the sector shape but may be, for example, a triangular shape or a trapezoidal shape.

In the practice of the embodiment now under discussion, the outlet side opening of the connecting portion 86 is so formed as to have a transverse dimension and a dimension (longitudinal dimension) perpendicular to the widthwise direction, both which are greater than those of the inlet side opening of the connecting portion 86. More specifically, the outlet side opening of the connecting portion 86 is so shaped as to represents a transversely elongated shape in the widthwise direction, and the inlet side opening of the connecting portion 86 is so shaped as to represent a round shape. Both of the widthwise dimension and the longitudinal dimension of the outlet side opening of the connecting portion 86 are so formed as to be greater than the diameter of the inlet side opening of the connecting portion 86.

As shown in FIG. 5, within the interior of the air intake chamber 74, there is provided a rectifying member 90 operable to avoid a bias of the flow of the pressurized air within the interior space of the air intake chamber 74. In the practice of the embodiment now under discussion, the rectifying member 90 is in the form of a punched metal sheet having a multiplicity of throughholes (a flow passage resistance portion) defined therein and extending over the entire width of the interior space of the air intake chamber 74. It is, however, to be noted that the rectifying member 90 may not be necessarily limited to the punched metal sheet.

The use of the rectifying member 90 is effective to suppress the bias in the amount of the intake air I that is guided towards the outlet 73 even when the distance between the inlet 77 and outlet 73 of the air intake chamber 74 is small. This rectifying member 90 is disposed intermediate between the inlet 77 and the outlet 73 so as to traverse the intake air passage. By disposing a plurality of flow passage resistance portions in a fashion spaced in the widthwise direction, the bias of the flow in the widthwise direction can be suppressed.

In the practice of the embodiment now under discussion, the rectifying member 90 is so disposed as to incline downwardly in the chamber rearward direction, and therefore, the bias of the intake air pressure at a region which confronts from above with the outlet 73 can be suppressed. It is, however, to be noted that by applying a bias or variation to the shape of the flow passage resistance portion of the rectifying member 90 in the vehicle widthwise direction, the intake air pressure distribution at the outlet 73 can be biased to thereby suppress variation of the intake air amount for each cylinder. More specifically, it is to be noted that arrangement may be made to increase the pressure in the vicinity of the outlet 73 corresponding to the cylinder which otherwise tends to generate low output. It is, however, to be noted that the use of the rectifying member 90 may not be essential in the practice of the present invention and may therefore be dispensed with.

The dimension L from the inlet 77 to the outlet 73 within the interior space of the air intake chamber 74 shown in FIG. 3 is chosen to be three times the inner diameter D of the outlet 73. This dimension L is a dimension in a direction perpendicular to the axis AX of the outlet 73.

Figure 6:
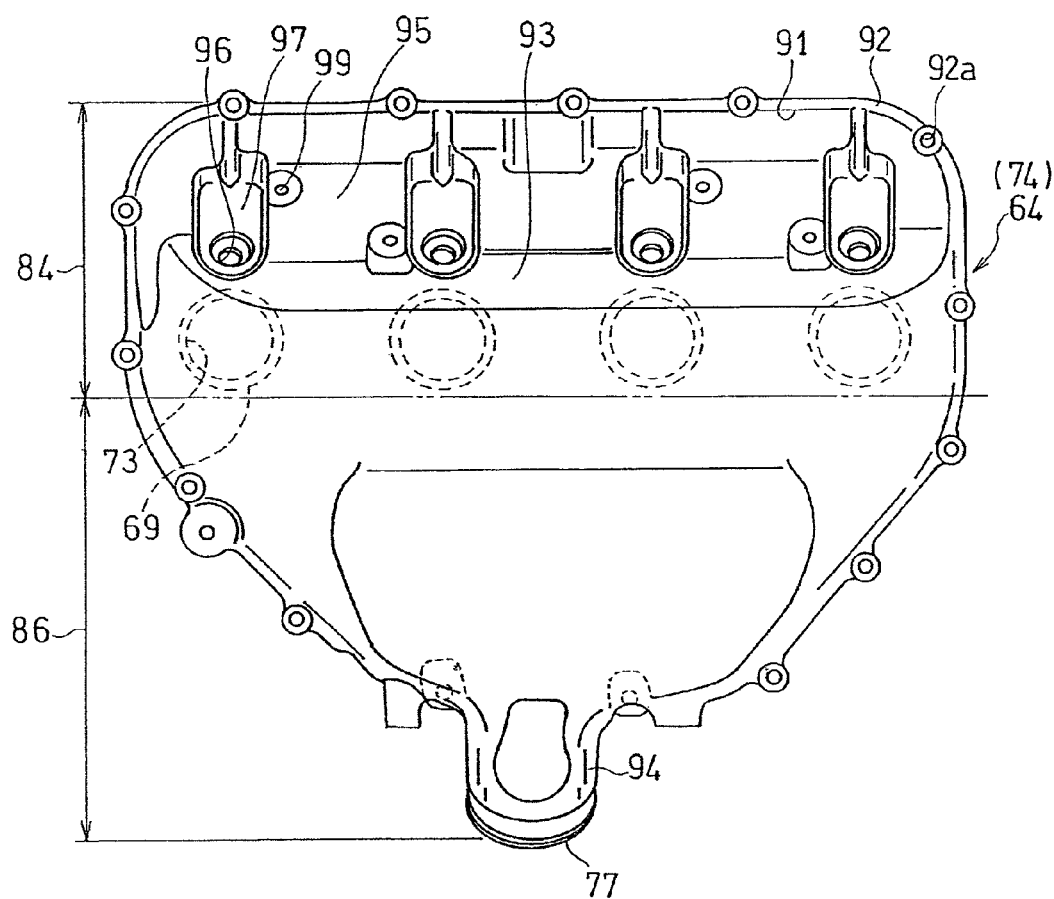
FIG. 6 is a schematic top plan view showing a chamber main body of the air intake chamber.
Figure 7:
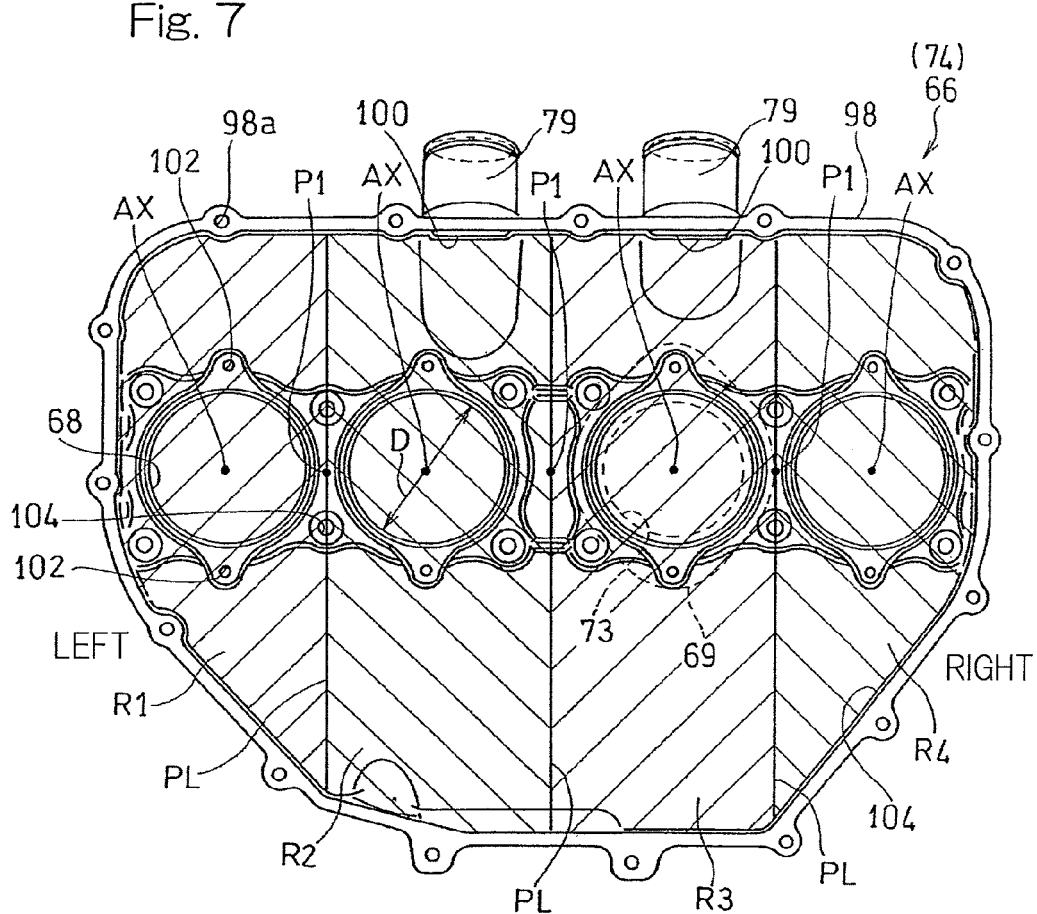
FIG. 7 is a schematic top plan view showing a holder for the air intake chamber.

FIG. 6 illustrates a schematic top plan view of the chamber main body 64 of the air intake chamber 74, and FIG. 7 illustrates a schematic top plan view of the holder 66 in the air intake chamber 74. By the chamber main body 64 and the holder 66, the confronting portion 84 and the connecting portion 86 are integrally molded. The chamber main body 64 shown in FIG. 6 includes a flange portion 92 formed in a peripheral edge of an opening 91 open downwardly. A plurality of insertion holes 92a oriented in the vertical direction are formed in this flange portion 92.

The chamber main body 64 has a rear end formed integrally with an inlet tube 94 which forms the inlet 77 of the air intake chamber 74. An upper surface of a front portion of the chamber main body 64, which is an outer surface of the air intake chamber 74, is formed with an inclined portion 93 (See FIG. 5) that is inclined downwardly towards forwards, and also with a recessed mounting area 95 (See FIG. 5) that extends from a front end of the inclined portion 93 to a front end of the upper surface of the chamber main body 64. As shown in FIG. 5, the recessed mounting area 95 is downwardly depressed as compared with the upper surface of the front portion of the chamber main body 64.

As shown in FIG. 6, the recessed mounting area 95 is formed with a plurality of, for example, four injector seating faces 97 that are juxtaposed side by side in the widthwise direction and are employed in correspondence with the number of the cylinders of the combustion engine E. The injector 75 is disposed on each injector seating face 97. With the injector 75 employed for each cylinder, a variation in air and fuel mixing ratio can be suppressed, and also the amount of fuel that is simultaneously injected can be increased. The injector seating face 97 is further downwardly depressed from the recessed mounting area 95. Accordingly, with the injector seating face 97 disposed downwardly of the upper surface of the front portion of the chamber main body 64, it is possible to suppress the amount of protrusion of the injector 75 in an upward direction while the capacity of the air intake chamber 74 is secured.

Each injector seating face 97 is formed with an injector mounting hole 96 in which the corresponding injector 75 is mounted. In the vicinity of each injector seating face 97 in the recessed mounting area 95, a fuel tube mounting hole 99 in the form of a threaded hole that is oriented upwards is formed.

The holder 66 shown in FIG. 7 includes a flanged portion 98 formed in a peripheral edge of an upwardly oriented opening 101. At a position of the flanged portion 98 corresponding to the insertion hole 92a (FIG. 6) in the chamber main body 64, a treaded hole 98a that is oriented in the vertical direction is formed.

The two connecting tubes 79 formed in the front end of the holder 66 are communicated with the interior space of the air intake chamber 74 through respective throughholes 100 defined in the front wall of the holder 66. In order to increase the interior space around the outlet 73 of the air intake chamber 74, a vehicle widthwise direction intermediate portion of the front portion of the air intake chamber 74 may be swelled forwards as compared with a vehicle widthwise direction outer side portion. By so doing, an undesirable reduction of the intake air pressure in the vicinity of the outlet 73 can be suppressed. In the practice of the embodiment now under discussion, a space formed by the two connecting tubes 79 are utilized to increase the interior space on a vehicle widthwise direction inner side around the outlet 73.

The four cylinder side opening 68 that are lined in the widthwise direction are formed in intermediate portion of the holder 66 with respect to the forward and rearward direction. On front and rear sides of each cylinder side opening 68, a funnel mounting holes 102 in the form of a threaded hole oriented in the vertical direction are formed. Also, on both sides of each cylinder side opening 68, bolt insertion holes 104 in the form of a throughhole oriented in the vertical direction are formed.

The details of the injector 75 will be discussed. As shown in FIG. 3, the injector 75 is disposed with the axis IX thereof inclined relative to the axis AX of the output of the air intake chamber 74. More specifically, the axis Ax is disposed having been inclined somewhat rearwardly from the vertical direction, and the axis IX of the injector 75 is disposed having been inclined so as to extend in a rearwardly downwardly. Also, the fuel injection port 75a of the injector 75 is provided at a position displaced from the axis AX of the outlet of the air intake chamber 74.

The injector 75 has an upper end positioned at a location substantially the same height of an upper end of the air intake chamber 74. The upper end of the injector 75 is preferably disposed so as to assume a position lower than the upper end of the air intake chamber 74. The front surface of the air intake chamber 74 is positioned forwardly of the front surface of the injector 75.

Assemblage and mounting of the air intake chamber 74 will now be described. At the outset, the holder 66 is fixed to the throttle body 76. More specifically, in a condition that the cylinder side opening 68 in the holder 66 shown in FIG. 7 is aligned with the inlet of the throttle body 76, the bolt (not shown) is inserted from above into the bolt insertion hole 104. Subsequently, the bolt is threaded into a threaded hole (not shown) provided in the throttle body 76, shown in FIG. 5, to thereby fix the holder 66 to the throttle body 76.

Thereafter, the funnel 69 is fitted to the holder 66. More specifically, from the inner side of the holder shown in FIG. 7, the funnel 69 is fitted to the cylinder side opening 68, and a bolt (not shown) is threaded into the funnel mounting hole 102.

Following the mounting of the funnel 69 over the cylinder side opening 68, the relief valve 80 shown in FIG. 2 is fitted to the connecting tube 79 of the holder 66. More specifically, the relief valve 80 is mounted in an outer peripheral to surface of the connecting tube 79 and, with the use of a pressing means such as, for example, a rubber tube, a mounting portion is urged against an outer peripheral surface of the relief valve 80. Thereby, the relief valve 80 is fitted to the connecting tube 79.

Furthermore, the injector 75 and the delivery tube 21 are fitted to the chamber main body 64. At the outset, the four injectors 75 have been fitted to the delivery tube 21. Starting from this condition, each of the injector 75 is mounted in the corresponding injector mounting hole 96 and, with the use of a bolt (not shown), the delivery tube 21 (shown in FIG. 4) is fitted from above to the fuel tube mounting hole 99.

Further, the holder 66 shown in FIG. 3 and the chamber main body 64 are connected together. At the outset, as hereinabove described, the discharge port 48 of the supercharger 42 and the inlet 77 of the air intake chamber 74 provided in the chamber main body 64 are connected together, and the front portion of the chamber main body 64 is fixed to the supercharger 42. Thereafter, the holder 66 and the chamber main body 64 are threadingly connected together. At the last, the delivery tube 21 shown in FIG. 2 and the fuel tube 19 are connected together.

In the following description, the operation of the air intake system for the combustion engine E will be discussed. When the motorcycle starts running, the incoming wind is introduced as the intake air I from the air intake opening 24 into the air intake duct 70. The intake air I flows rearwardly within the air intake duct 70 and is guided towards the air cleaner 40, shown in FIG. 2, after having been deflected towards a vehicle widthwise direction inner side.

The intake air I so guided into the air cleaner 40 is, after having been substantially purified by the air cleaner 40, introduced into the supercharger 42. The intake air I so introduced into the supercharger 42 is, after the pressure thereof has been increased by the impeller 50, discharged from the discharge port 48. The high pressure intake air I so discharged from the supercharger 42 flows, as shown in FIG. 4, towards the cylinder side opening 68 while having been expanded within the air intake chamber 74. During the flow towards the cylinder side opening 68, the temperature of the intake air I is lowered.

The intake air I flows towards the cylinder side opening 68 after the bias in flow thereof has been suppressed by the rectifying member 90 shown in FIG. 5. The fuel F is injected from the injector 75 to the intake air I having passed through the rectifying member 90. The intake air I with the fuel F, to which the fuel F has been injected, has its temperature further lowered by heat of evaporation of the fuel F, and is then supplied from the funnel 69 to the air intake port 47 (shown in FIG. 1) of the combustion engine E by way of the throttle body 76. The injector 75, since the fuel is injected in an atomized form, is effective to achieve a temperature reduction over a wide range by the effect of the heat of evaporation. In the practice of the embodiment now under discussion, at the timing at which the intake air I is introduced from the supercharger 42 to the air intake chamber 74, the temperature of the intake air I, which has been about 150° C., is lowered down to about 130° C. during the passage through the air intake chamber 74.

Also, when the pressure inside the supercharged air passage on the downstream side of the supercharger 42 becomes higher than a predetermined value, the relief valve 80 (shown in FIG. 2) provided in the air intake chamber 74 is opened to thereby adjust the pressure inside the supercharged air passage including the air intake chamber 74. As shown in FIG. 2, a high pressure air A vented from the relief valve 80 is introduced into the air cleaner 40 after having flows through the relief tube 83 forming the relief passage 82.

As described above, the use of the air intake chamber structure designed in accordance with the preferred embodiment is effective to provide a required output through the reduction of the intake air temperature, even though any cooling means for cooling the intake air I, that is, a so-called intercooler is not employed. As a result thereof, in a quantity corresponding to the intercooler having been dispensed with, the structure can be simplified to reduce the cost of manufacture.

The capacity V of the interior space of the air intake chamber 74 will now be discussed. The wording "capacity of the interior space of the air intake chamber" referred to hereinabove and hereinafter means the volume defined by the chamber in its entirety when the outlet 73 of the air intake chamber 74 is traversed or cut out by the plane of extension of the inner surface of the air intake chamber 74 or the cleaner inlet 60. Where the inlet 77 of the air intake chamber 74 is connected directly with the discharge port 48 of the supercharger 42 as is the case with the embodiment now under discussion, the capacity of the air intake chamber 74 may be a capacity from the discharge port 48 of the supercharger 42 to the inlet of the throttle body 76. The capacity V of the interior space of the air intake chamber 74 is equal to or greater than twice the displacement X of the combustion engine E. If the capacity V of the air intake chamber 74 is not greater than twice the displacement, there is the possibility that the intake air temperature cannot be sufficiently lowered.

The capacity V of the interior space referred to above is preferably within three to eight times the displacement of the combustion engine. In the practice of the embodiment now under discussion, the displacement of the combustion engine E is 1,000 cc and the capacity V of the air intake chamber 74 is 6,000 cc. If the capacity V of the air intake chamber 74 is of a value that is three or more times the displacement, the intake air temperature can be further lowered. Also, if the capacity V of the air intake chamber 74 is chosen to be of a value greater than eight times the displacement, a time lag required to reach from a non-pressurized condition to a pressurized condition is rendered to be so large and the case may occur that the output response relative to a rider's manipulation will be lowered.

In other words, when the number of the cylinders in the combustion engine is of a value expressed by n and the displacement of the combustion engine is of a value expressed by X, the capacity V of the interior space of the chamber is preferably set to (V/n)≥0.5X. The capacity V of the interior space of the chamber is set to (V/n)≥X, more preferably.

More specifically, as shown in FIG. 7, the interior space of the air intake chamber 74 is divided into four regions R1 to R4 which are obtained by dividing by the plane PL that contains the geometric center of each neighboring cylinder side opening 68, that is, the intermediate point P1 between the neighboring outlets 73 and lies perpendicular to the direction in which the cylinder side openings 68 are laid (in the widthwise direction) and parallel to the axis AX of the cylinder side opening 68. The capacity V of the air intake chamber 74 is so defined that the smallest value of one of volumes V1 to V4 of respective interior spaces of the four divided regions R1 to R4 may become larger than half the displacement X of the combustion engine. In the practice of the embodiment now under discussion, the smallest value of the capacity V1 of the interior space of the divided region R1 is set to be larger than half the displacement X of the combustion engine. The four divided regions R1 to R4 are lined up in the sequence of the divided regions R1 to R4 from left to right. The volume V of the interior space of the air intake chamber 74 is preferably defined so that the minimum value V1 may become greater than the displacement X.

Since the outlet 73 of the air intake chamber 74 is provided for each cylinders, in total the passage area of the outlet 73 is rendered to be large. Therefore, the passage resistance during the suction from the cylinder is reduced and, correspondingly, the need arises to increase the capacity V of the air intake chamber 74. In view of this, the capacity V of the air intake chamber 74 is preferably of a value greater than 8 times the displacement for each cylinder. Also, the capacity V of the air intake chamber 74 is more preferably of a value greater than 12 times the cylinder capacity for each cylinder but smaller than 32 times the cylinder capacity for each cylinder.

The discharge rate of the supercharger per unit time is so set as to be larger than the displacement of the combustion engine per unit time. Accordingly, the air of a pressure higher than 1 atmospheric pressure can be led to the cylinder. More specifically, at the standard state (SATP) of a gas, where the discharge rate of the supercharger 42 exhibited upon one complete rotation of the impeller 50 of the supercharger 42, when gas in the doorway of the supercharger is at the standard state, is expressed by α liters, the speed increasing ratio of the supercharger 42 during one complete rotation of the crankshaft is expressed by β and the displacement of the combustion engine is expressed by γ, the discharge rate is set to (2×α×(3)>γ. By adjusting the discharge rate of the supercharger 42 and the air-intake of the combustion engine, the interior of the air intake chamber 74 is so set as to attain a pressure not higher than a predetermined pressure. In the practice of the embodiment under discussion, with the incoming wind led to the supercharger, the pressure on the inlet side can be increased and the discharge rate of the supercharger can be further increased.

The pressure inside the air intake chamber 74 is preferably set to a value equal to or higher than 1.5 bar and, more preferably, to a value equal to or higher than 2 bar. In the practice of the embodiment now under discussion, the pressure inside the air intake chamber 74 is set to 2.5 bar. With the pressure of the interior of the air intake chamber 74 set to the pressure higher than the atmospheric pressure, the charging volume in the cylinder is increased and the engine output increased accordingly. Where the interior of the air intake chamber 74 is set to a predetermined pressure Pa (bar), it is preferred to set the capacity V of the air intake chamber 74 to be V (≥(Pa/Pb)×Q) that is a value equal to or higher than the product of the displacement Q multiplied by the value of the predetermined pressure Pa (bar) divided by the atmospheric pressure Pb, that is, (Pa/Pb). If the capacity V of the air intake chamber 74 is set to a value smaller than the value discussed above, it may occur that a bias in the pressure distribution within the interior of the air intake chamber 74 will be caused by the intake air to be supplied to the combustion engine E and/or a sufficient amount of the intake air I will not be supplied to the combustion engine E.

Also, where the maximum pressure at which the relief valve 80 operates is set to, for example, Pc, it is preferred to set the capacity V to be V (≥(Pc/Pb)×Q) of the air intake chamber 74, that is a value equal to or higher than the product of the displacement Q multiplied by the value of the maximum pressure Pc divided by the atmospheric pressure Pb, that is, (Pc/Pb).

Assuming that the speed increasing ratio of the supercharger relative to the crankshaft is expressed by N, the number of rotations of the supercharger at the time of the maximum output is expressed by A (rpm), and the discharge mass flow rate of the supercharger at the time of the maximum output is expressed by B (kg/sec), the mass M of the air discharged per one complete rotation of the crankshaft can be obtained from M=(B×60)/(A/N). In this equation, the mass C of the air within the air intake chamber 74 at the time of the maximum output is preferably C≥4M.

In other words, the air intake chamber 74 is so formed to have such a size enough to accommodate a mass of the air that is four or more times the mass M of the air discharged per one complete rotation of the crankshaft at the time of the maximum output. Preferably, the air intake chamber 74 is so formed to have a size enough to accommodate the mass of air that is within the range of 5 times to 15 times the mass M, that is, (15M≥C≥5M), but in the practice of the embodiment now under discussion the air intake chamber 74 can accommodate the mass of air which is 10 times the mass, that is, (C=10M).

If the capacity of the air intake chamber is too large, there is a possibility that the output response to a throttle opening operation performed by the driver will be lowered. In view of this, when the supercharger 42 is rotated from a condition, in which the pressure within the air intake chamber 74 is equal to the atmospheric pressure, at the rotational number at the maximum output, the pressure within the air intake chamber 74 attains, at a speed not lower than, for example, 0.1 second, a predetermined pressure that is set at the time of the maximum output, and is more preferably lower than 0.05 second. In the practice of the embodiment now under discussion, it is set to about 0.025 second.

Even though the capacity V of the air intake chamber 74 is so set as hereinabove discussed, the required engine output can be obtained with no intercooler employed. Therefore, by a quantity corresponding to the intercooler so dispensed with, the structure can be simplified to reduce the cost of manufacture. Also, if the injector 75 capable of injecting the fuel in the atomized form into the interior of the air intake chamber 74 as hereinbefore described is used in combination, the intake air temperature within the interior of the air intake chamber 74 can be further lowered.

In the construction hereinabove described, the inventors of the present invention have found that when the capacity for accumulating the intake air at a location upstream of the throttle body 76 is increased, the output of the combustion engine increases. However, if the widthwise dimension and/or the vertical direction dimension are increased in the vicinity of the throttle body 76, the dimension of the motorcycle comes to be large and the degree of freedom in configurational design is lowered, Accordingly, as shown in FIG. 2, the connecting portion 86, which is a portion hitherto used as a connecting tube between the supercharger 42 and the air intake chamber 74, is used as a part of the air intake chamber 74 to thereby increase the capacity V of the air intake chamber 74. Accordingly, an appropriate chamber shape can be maintained in the vicinity of the throttle body and the output of the combustion engine E can be increased while suppressing the increase in size of the motorcycle and the reduction in degree of freedom in designing.

Also, the widthwise dimension W3 of the outlet side opening of the connecting portion 86 is set to the same value as that of the widthwise dimension of the air intake chamber 74, and the widthwise dimension W1 of the inlet opening of the connecting portion 86 is set to the same dimension as the diameter of the discharge port 48 of the supercharger 42. Further, the connecting portion 86 has a transverse width increasing gradually from the inlet to the outlet. Accordingly, since the flow velocity of the intake air becomes gradually small, the turbulence of flow of the intake air incident to deceleration is suppressed and the air intake efficiency increases.

As shown in FIG. 5, since the discharge port 48 of the supercharger 42 is disposed spaced rearwardly from the confronting portion 84, the capacity of the air intake chamber 74 can be increased by increasing the longitudinal dimension of the connecting portion 86.

The impeller shaft 51 of the supercharger 42 shown in FIG. 5 is positioned above a rear portion of the crankcase 28 (shown in FIG. 3) and the discharge port 48 of the supercharger 42 is positioned rearwardly of the impeller shaft 51. Thus, by increasing the longitudinal dimension of the connecting portion 86 between the confronting portion 84 and the discharge port 48 of the supercharger 42, the capacity of the air intake chamber 74 can be increased.

As shown in FIG. 1, the air intake duct 70, through which the incoming wind flowing forwardly of the combustion engine E is guided towards the supercharger 42, passes laterally of the cylinder block 30. Accordingly, while the interference between the air intake chamber 74 and the air intake duct 70 is avoided, the capacity of the air intake chamber 74 can be increased.

The cylinder head 32 of the combustion engine E is disposed having been tilted forwards, and the confronting portion 84 (shown in FIG. 5) is disposed diagonally rearwardly and above the cylinder block 30. Accordingly, in a quantity corresponding to the cylinder head 32 having been tilted forwards, the air intake chamber 74 can be expanded in the longitudinal direction.

The front wall 74a of thee air intake chamber 74 shown in FIG. 5 is disposed having protruded forwardly of a throttle body mounting portion in the confronting portion 84. Accordingly, in a quantity corresponding to the front wall 74a having been protruded forwards, the air intake chamber 74 can be expanded in the longitudinal direction.

The distance (dimension L) from the inlet 77 to the outlet 73 can be increased when the dimension from the upstream end portion on the inlet side to the downstream end portion on the exist side of the interior space of the air intake chamber 74 is chosen to be three or more times the inner diameter D of the outlet 73 shown in FIG. 7. Accordingly, by the effect of heat dissipation from an outer wall of the air intake chamber 74, the intake air temperature can be lowered and the output of the combustion engine increases.

As shown in FIG. 4, the four outlets 73 corresponding to the respective cylinders, that is, the cylinder side openings 68 are disposed having been juxtaposed in the transverse direction. In the intermediate neighboring two cylinder side openings 68, which are positioned intermediate between the remaining two cylinder side openings 68, the suppressing member 88 is provided for suppressing the movement of the intake air I from the region, adjacent to one of the cylinder side openings 68, to the vicinity of the other of the cylinder side openings 68. Accordingly, the intake air I can be uniformly supplied to the cylinders.

As shown in FIG. 5, since the rectifying member 90 for avoiding the bias in the flow of the intake air I is provided inside the air intake chamber 74, the intake air I can be stably supplied to the air intake port 47.

The inventors of the present invention have found that when the capacity of the interior space of the air intake chamber 84 is increased, the temperature of the intake air I discharged from the supercharger 42 has been lowered. Thus, with the temperature of the intake air lowered, the ignition timing of the combustion engine can be advanced while avoiding the occurrence of knocking. Hence, an improvement in output of the combustion engine can be accomplished. If the capacity V of the interior space of the air intake chamber 74 is of a value equal to or larger than twice the displacement of the combustion engine, a sufficient improvement in engine output can be achieved. Also, if the capacity V of the interior space of the air intake chamber 74 exceeds eight times the displacement of the combustion engine, there is a possibility that the output response to the throttle opening operation by the driver will be lowered. Therefore, the capacity V is preferably within the three to eight times the engine displacement. In the case of the motorcycle, the capacity V of the air intake chamber 74 is preferably set to a value equal to or smaller than 8,000 cc (8 liters).

The dimension from the upstream end portion on the inlet side to the downstream end portion on the outlet side of the interior space of the air intake chamber 74 is equal to or greater than three times the inner diameter D forming the outlet 73 shown in FIG. 7. Therefore, the distance from the inlet to the outlet is rendered to be long. Accordingly, by the effect of heat dissipation from the outer wall of the air intake chamber 74, the intake air temperature can be lowered and the output of the combustion engine increases.

In other words, the capacity V of the interior space of the air intake chamber 74 is set to $(V/n) \geq 0.5X$ when the number of the cylinders of the combustion engine is n and the displacement of the combustion engine is X. Also, the capacity V is preferably set to $(V/n) \geq X$. Accordingly, since a capacity higher than the capacity to which the air is sucked during one intake stroke of the combustion engine is secured, reduction in pressure can be further prevented.

In addition, the capacity V of the interior space of the air intake chamber 74 is so set that, of the respective capacities V1 to V4 of the corresponding interior spaces of the four divided regions R1 to R4, the minimum value V1 may become larger than half the engine displacement X. The capacity V is preferably so set that the minimum value V1 may become larger than the engine displacement X. Accordingly, the sufficient capacity V of the interior space of the air intake chamber can be secured and the reduction in intake air pressure can be further suppressed.

Also, relative to the mass M of the intake air I discharged from the supercharger 42 per one complete rotation of the crankshaft, the mass C of the intake air I accumulated within the interior of the air intake chamber during a maximum output generating condition is defined C≥4M. By so defining, the output increase of the combustion engine can be achieved.

By the effect of heat of evaporation of the fuel F injected from the injector 75 shown in FIG. 5, the intake air I is cooled, and therefore, the ignition timing of the combustion engine can be brought to a desired timing. As a result thereof, the engine output increases. Also, the fuel injecting port 75a of the injector 75 is disposed at a location displaced from the axis AX of the outlet 73 of the air intake chamber 74. Accordingly, the distance between the fuel injecting port 75a and the outlet 73 is rendered to be great and the heat of evaporation can be effectively utilized, resulting in increase of the cooling effect.

Moreover, on the upper surface of the air intake chamber 74 the injector 75 is disposed, and the axis IX of the injector 75 is inclined relative to the outlet axis Ax. Therefore, the amount of protrusion of the injector 75 upwardly from the air intake chamber 74 is suppressed. As a result thereof, a space for the fuel tank 15 disposed above the air intake chamber 74 is not oppressed.

Yet, the inlet 77 is formed in the rear portion of the air intake chamber 74 and the cylinder side opening 68 (shown in FIG. 4), which forms the outlet, is formed in the front portion thereof, with the axis IX of the injector 75 disposed to incline in a diagonally downward and rearward direction. Accordingly, since the injector 75 does not oppress the upper surface of the front portion of the air intake chamber 74, the fuel tank 15 is easily disposed above the air intake chamber 74.

Furthermore, since the injector 75 is mounted in the recessed mounting area 95 in the upper surface of the air intake chamber 74, the length over which the injector 75 protrudes outwardly from an outer surface of the air intake chamber 75 can be suppressed.

Since the air intake chamber 74 is made of an aluminum alloy of a kind having a high heat dissipating property, the injector 75 can be supported stably by the air intake chamber 74, and also heat dissipation of the intake air I from the outer wall of the air intake chamber 74 can be promoted, to thereby further effectively lower the intake air temperature.

As shown in FIG. 3, the air intake chamber 74 is disposed at a location diagonally upwardly and rearwardly of the cylinder block 30 of the combustion engine E, the injector 75 is disposed on the upper surface of the air intake chamber 74, and the air intake duct 70 passes laterally of the cylinder block 30. Accordingly, as compared with the case in which the air intake duct 70 passes above the combustion engine E, interference of the air intake duct 70 with the injector 75 or a member disposed above the combustion engine, for example, the fuel tank 15 can be avoided. As a result thereof, the degree of freedom in configurational designing above the combustion engine can be improved.

Also, when viewing the air intake chamber 74 from lateral side, since the air intake chamber 74 is inclined rearwardly downwardly, the rear half portion of the air intake chamber 74 is lowered in the vertical direction. As a result thereof, the capacity of a rear portion of the fuel tank 15 disposed above the air intake chamber 74 can be increased.

In addition, since the upper end of the injector 75 disposed on the upper surface of the air intake chamber 74 is positioned at the substantially same height as that of the upper end of the air intake chamber 74, it is possible to prevent the injector 75 from protruding upwardly from the air intake chamber 74.

As shown in FIG. 2, the fuel tube 19 for the injector 75 is, after extending forwards from the delivery tube 21, connected with the fuel pump 17. Accordingly, the fuel tube 19 does not protrude upwardly from the upper surface of the air intake chamber 74.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing the preferred embodiment of the present invention the discharge port 48 of the supercharger 42 has been shown and described as oriented upwards, the discharge port 48 may be oriented diagonally upwardly and rearwards. In this case, the inlet 77 of the air intake chamber 74 comes to be positioned further rearwardly and, therefore, the longitudinal dimension of the air intake chamber 74 becomes large, resulting in securing the large capacity of the air intake chamber 74.

Figure 8:
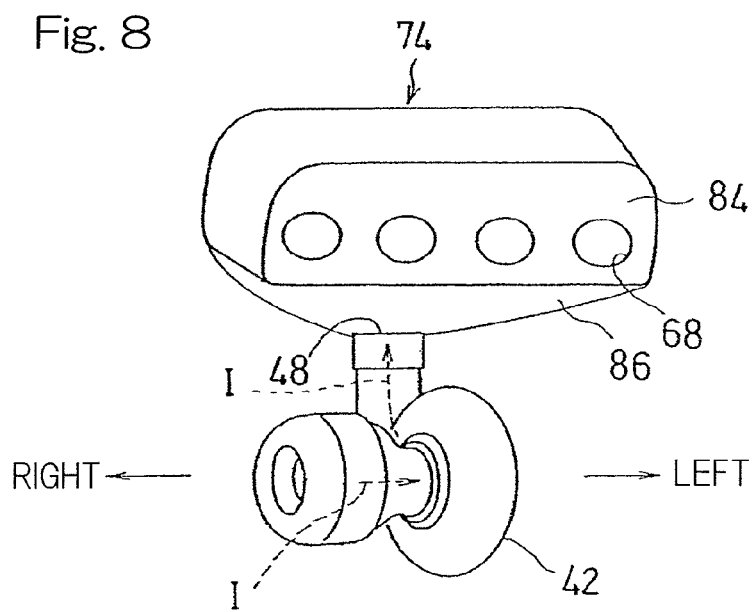
FIG. 8 is a perspective view showing the air intake chamber according to a different example of the present invention as viewed in a direction diagonally rightward and upwardly.

Also, the connecting portion 86 may suffice to be disposed between the discharge port 48 of the supercharger 42 and the confronting portion 84. For example, where the discharge port 48 is positioned below the confronting portion 84 as shown in FIG. 8, the connecting portion 86 is disposed at a location above the discharge port 48 and below the confronting portion 84. Moreover, the discharge port 48 of the supercharger 42 may be disposed having been displaced in one vehicle widthwise direction, besides a location intermediate of the crankcase 28 in the vehicle widthwise direction.

Yet, the present invention can be applied to any saddle-riding type vehicle other than the motorcycle, for example, a buggy having more than two wheels. In addition, the present invention may be particularly applied to any automotive vehicle of a type having a limited vehicle widthwise dimension. Furthermore, the supercharger may be driven by the power other than the power of the combustion engine, for example, with the utilization of exhaust gas energies of the combustion engine and/or with the use of a separate electric motor. Yet, other than the centrifugal type, the Roots type supercharger may be equally used. Also, an intercooler for cooling the intake air I within the air intake chamber 74 may be employed.

Accordingly, such changes and modifications are, unless they depart from the scope of the present invention as delivered from the claims annexed hereto, to be construed as included therein.

REFERENCE NUMERALS

28 . . . Crankcase
30 . . . Cylinder block
32 . . . Cylinder head
42 . . . Supercharger
47 . . . Air intake port
48 . . . Discharge port
51 . . . Impeller shaft
70 . . . Air intake duct
73 . . . Outlet of the air intake chamber
74 . . . Air intake chamber
74a . . . Front wall
76 . . . Throttle body
84 . . . Confronting portion 86 . . . Connecting portion
88 . . . Suppressing member
90 . . . Rectifying member
AX . . . Axis of the outlet of the air intake chamber
E . . . Combustion engine
I . . . Intake air

What is claimed is:

1. A saddle-riding type vehicle, comprising;
an engine;
a supercharger with a discharge port, which is operable to pressurize and supply an intake air to the engine;
a throttle body configured to control the amount of intake air to be supplied to an air intake port of the engine;
an air intake chamber disposed downstream of the discharge port of the supercharger and upstream of the throttle body, wherein the air intake chamber comprises:
a confronting portion of the air intake chamber having an outlet of the air intake chamber and overlapping the throttle body, the confronting portion defining an interior space of a portion above the throttle body in a direction along an axis of the outlet of the air intake chamber in which the discharge port of the supercharger is disposed at a location separated rearwardly of the confronting portion and the supercharger has an impeller shaft that is positioned above a rear portion of a crankcase; and
a connecting portion of the air intake chamber to connect the confronting portion and the discharge port of the supercharger, the connecting portion having an outlet side opening that is set to be larger than an inlet side opening, wherein
the connecting portion has a transverse width that continuously increases from the inlet side opening towards the outlet side opening.

2. The saddle-riding type vehicle as claimed in claim 1, in which:
the outlet side opening of the connecting portion has a widthwise dimension that is set to the same dimension as a widthwise dimension of the confronting portion; and
the inlet side opening of the connecting portion has a widthwise dimension that is set to the same dimension as a diameter of the discharge port of the supercharger.

3. The saddle-riding type vehicle as claimed in claim 1, in which the discharge port of the supercharger is positioned rearwardly of the impeller shaft.

4. The saddle-riding type vehicle as claimed in claim 1, in which a dimension from an upstream end to a downstream end of the air intake chamber is equal to or greater than three times an inner diameter of the outlet of the air intake chamber.

5. A saddle-riding type vehicle comprising;
an engine;
a supercharger with a discharge port, which is operable to pressurize and supply an intake air to the engine;
a throttle body configured to control the amount of intake air to be supplied to an air intake port of the engine;
an air intake chamber disposed downstream of the discharge port of the supercharger and upstream of the throttle body, wherein the air intake chamber comprises:
a confronting portion of the air intake chamber having an outlet of the air intake chamber and overlapping the throttle body, the confronting portion defining an interior space of a portion above the throttle body in a direction along an axis of the outlet of the air intake chamber; and
a connecting portion of the air intake chamber to connect the confronting portion and the discharge port of the supercharger, the connecting portion having an outlet side opening that is set to be larger than an inlet side opening, wherein
the connecting portion has a transverse width that continuously increases from the inlet side opening towards the outlet side opening;
the air intake chamber is disposed above a cylinder block of the engine, and the supercharger is disposed rearwardly of the cylinder block of the engine and above a crankcase of the engine; and
an intake air duct configured to guide an incoming wind, then flowing forwardly of the engine, towards the supercharger, is disposed to pass laterally of the cylinder block.

6. A saddle-riding type vehicle comprising;
an engine;
a supercharger with a discharge port, which is operable to pressurize and supply an intake air to the engine;
a throttle body configured to control the amount of intake air to be supplied to an air intake port of the engine;
an air intake chamber disposed downstream of the discharge port of the supercharger and upstream of the throttle body, wherein the air intake chamber comprises:
a confronting portion of the air intake chamber having an outlet of the air intake chamber and overlapping the throttle body, the confronting portion defining an interior space of a portion above the throttle body in a direction along an axis of the outlet of the air intake chamber; and
a connecting portion of the air intake chamber to connect the confronting portion and the discharge port of the supercharger, the connecting portion having an outlet side opening that is set to be larger than an inlet side opening, wherein
the connecting portion has a transverse width that continuously increases from the inlet side opening towards the outlet side opening;
the supercharger is disposed rearwardly of a cylinder block of the engine; and
the air intake chamber has a front wall protruding to be positioned forwardly of the throttle body in the confronting portion of the air intake chamber.

7. A saddle-riding type vehicle comprising;
an engine;
a supercharger with a discharge port, which is operable to pressurize and supply an intake air to the engine;
a throttle body configured to control the amount of intake air to be supplied to an air intake port of the engine;
an air intake chamber disposed downstream of the discharge port of the supercharger and upstream of the throttle body, wherein the air intake chamber comprises:
a confronting portion of the air intake chamber having an outlet of the air intake chamber and overlapping the throttle body, the confronting portion defining an interior space of a portion above the throttle body in a direction along an axis of the outlet of the air intake chamber; and
a connecting portion of the air intake chamber to connect the confronting portion and the discharge port of the supercharger, the connecting portion having an outlet side opening that is set to be larger than an inlet side opening, wherein the connecting portion has a transverse width that continuously increases from the inlet side opening towards the outlet side opening;

an inlet is formed in a rear of the air intake chamber and the outlet is formed in a front portion of the air intake chamber;

the outlet is disposed above the throttle body; and the supercharger is disposed above a crankcase of the engine, and the discharge port of the supercharger is oriented upwardly.

8. A saddle-riding type vehicle comprising;

an engine;

a supercharger with a discharge port, which is operable to pressurize and supply an intake air to the engine;

a throttle body configured to control the amount of intake air to be supplied to an air intake port of the engine;

an air intake chamber disposed downstream of the discharge port of the supercharger and upstream of the throttle body, wherein the air intake chamber comprises:

a confronting portion of the air intake chamber having an outlet of the air intake chamber and overlapping the throttle body, the confronting portion defining an interior space of a portion above the throttle body in a direction along an axis of the outlet of the air intake chamber; and a connecting portion of the air intake chamber to connect the confronting portion and the discharge port of the supercharger, the connecting portion having an outlet side opening that is set to be larger than an inlet side opening, wherein the connecting portion has a transverse width that continuously increases from the inlet side opening towards the outlet side opening;

in which the air intake chamber extends, in a longitudinal direction of the vehicle, from a rear end of a crankcase of the engine to a region forwardly of the throttle body.

* * * * *